(12) United States Patent
Gazit

(10) Patent No.: US 8,049,523 B2
(45) Date of Patent: Nov. 1, 2011

(54) CURRENT SENSING ON A MOSFET

(75) Inventor: Meir Gazit, Ashkelon (IL)

(73) Assignee: Solaredge Technologies Ltd., Herzlia (IL)

( * ) Notice: Subject to any disclaimer, the term of this patent is extended or adjusted under 35 U.S.C. 154(b) by 321 days.

(21) Appl. No.: 12/314,114

(22) Filed: Dec. 4, 2008

(65) Prior Publication Data

US 2009/0146671 A1 Jun. 11, 2009

Related U.S. Application Data

(60) Provisional application No. 60/992,589, filed on Dec. 5, 2007.

(51) Int. Cl.
*G01R 27/08* (2006.01)
(52) U.S. Cl. .......... 324/713; 361/87; 323/344; 323/282; 323/285
(58) Field of Classification Search .................. 324/713; 323/344
See application file for complete search history.

(56) References Cited

U.S. PATENT DOCUMENTS

| | | | | |
|---|---|---|---|---|
| 4,101,816 | A * | 7/1978 | Shepter ......................... | 318/130 |
| 7,138,786 | B2 * | 11/2006 | Ishigaki et al. ............... | 323/224 |
| 7,158,359 | B2 * | 1/2007 | Bertele et al. ................. | 361/93.9 |
| RE39,976 | E * | 1/2008 | Schiff et al. ................... | 323/285 |
| 7,352,154 | B2 * | 4/2008 | Cook ............................. | 320/116 |
| 7,385,380 | B2 * | 6/2008 | Ishigaki et al. ............... | 323/285 |
| 7,868,599 | B2 * | 1/2011 | Rahman et al. ............... | 323/282 |
| 2003/0058593 | A1 * | 3/2003 | Bertele et al. ................. | 361/63 |
| 2003/0214274 | A1 * | 11/2003 | Lethellier ...................... | 323/272 |
| 2004/0041548 | A1 * | 3/2004 | Perry ............................. | 323/282 |
| 2004/0169499 | A1 * | 9/2004 | Huang et al. .................. | 323/272 |
| 2004/0246226 | A1 * | 12/2004 | Moon ............................ | 345/102 |
| 2006/0113979 | A1 * | 6/2006 | Ishigaki et al. ............... | 323/282 |
| 2007/0075711 | A1 * | 4/2007 | Blanc et al. ................... | 324/713 |
| 2007/0164750 | A1 * | 7/2007 | Chen et al. .................... | 324/527 |
| 2007/0205778 | A1 * | 9/2007 | Fabbro et al. ................. | 324/713 |
| 2008/0024098 | A1 * | 1/2008 | Hojo .............................. | 323/282 |
| 2008/0088184 | A1 * | 4/2008 | Tung et al. ..................... | 307/80 |
| 2008/0246460 | A1 * | 10/2008 | Smith ........................... | 324/76.11 |

FOREIGN PATENT DOCUMENTS

| | | |
|---|---|---|
| EP | 0419093 | 3/1991 |
| EP | 1503490 | 2/2005 |
| EP | 1657557 | 5/2006 |
| WO | WO02/31517 | 4/2002 |

* cited by examiner

*Primary Examiner* — Melissa Koval
*Assistant Examiner* — Benjamin M Baldridge
(74) *Attorney, Agent, or Firm* — The Law Office of Micheal E. Kondoudis

(57) ABSTRACT

A device having a switch with a voltage applied across the switch. A current sensing circuit is connected to one terminal of the switch. The current sensing circuit receives power independently of the voltage applied across the switch. The power supply shares the other terminal of the switch with the current sensing circuit. The switch is adapted for opening and closing. When the switch closes, the current sensing circuit senses current through the switch and upon opening the switch the high voltage of the switch is blocked from the current sensing circuit. The sense current is caused to flow from the current sensing circuit to the other terminal when the switch is closed. The flow of the sense current produces a voltage which is compared differentially to another voltage referenced by the other terminal.

19 Claims, 5 Drawing Sheets

CURRENT SENSING ON A MOSFET

CROSS REFERENCE TO RELATED APPLICATIONS

The present invention benefits from U.S. application 60/992,589 filed 5 Dec. 2007 and is hereby incorporated by reference in its entirety.

TECHNICAL FIELD

The present invention relates to current sensing in electronic circuitry and specifically to a device and method for current sensing in a switching power converter.

DESCRIPTION OF RELATED ART

Reference is made to FIG. 1 which illustrates the conventional current sensing circuit of US 2008/0246460. US 2008/0246460 illustrates a conventional current sensing circuit 202 coupled to switching field-effect-transistors (FET) high side FET 210, and low side FET 206 within a switching regulator. The current-sensing-circuitry 202 is configured to bypass a small sense current 208 from the conducting current 209 of the switching-FET according to a sense ratio. The conducting current for the switching regulator is controlled by a control signal. Current sensing circuit 202 includes a sensing FET 204 which is coupled in parallel with low-side FET 206. Control logic 306 provides control signals to low-side FET 206, high side FET 210 and current sensing FET 204. More specifically, the drains and gates of both sensing FET 204 and low-side FET 206 are tied together. Hence, the same control signal that controls low-side FET 206 also controls sensing FET 204. The source of low-side FET 206 is connected to the ground while the source of sensing FET 204 is used as the output node. Although the sources of the two FETs are not tied together, it is desirable that they have the same voltage. US 2008/0246460 describes a technique that sets the source voltage of sensing FET 204 to be the same as the source voltage of low-side FET 206 below. Sensing FET 204 conducts a sense current 208, which is a small fraction of a main switching regulator current 209 conducted by low-side FET 206. The ratio between main switching regulator current 209 and sense current 208 is proportionate to a predetermined large number, e.g. greater than 500.

A characteristic of conventional current sensing circuit 202 is that sense current 208 is supplied by main current 209 of the switched power circuit. Similarly, another well established technique to sense current is to place a small sense resistor in series with the power train (for example on the ground rail) and measure the voltage drop across the sense resistor and thus estimate the current. The current sense resistor method draws current from the switched power circuit.

Thus there is a need for and it would be advantageous to have a current sensing device and method which does not draw current from the switched power circuit.

BRIEF SUMMARY

According to a feature of the present invention there is provided a device having a switch with a voltage applied across the switch. A current sensing circuit is connected to one terminal of the switch. The current sensing circuit receives power independently of the voltage applied across the switch. The power supply shares the other terminal of the switch with the current sensing circuit. The switch is adapted for opening and closing. When the switch closes, the current sensing circuit senses current through the switch and when said switch is open the high voltage of the switch is blocked from the current sensing circuit. The sense current is preferably caused to flow from the current sensing circuit to the other terminal when the switch is closed. The flow of the sense current produces a voltage which is compared differentially to another voltage referenced by the other terminal. The current sensing circuit may include an operational amplifier which outputs a voltage sense signal which is proportional to the current flowing through the switch. The current sensing circuit may include a switched power converter which includes the switch. The current sensing circuit senses the current while the voltage output of the switched power converter is switched to a common rail. The current sensing circuit draws power independently and not from the switched power converter. The switch is preferably a MOSFET, but may be one of many other switch types—such as, by way of example, insulated-gate bipolar transistor (IGBT), bipolar junction transistor (BJT) or other transistors or similar devices. The switched power converter may be a buck converter or a boost converter or a buck and boost converter. Additionally an inductor is connected to the terminal of the switch and the current sensing circuit senses current through the inductor and does not integrate voltage across the inductor.

According to a feature of the present invention there is provided a method in a device including a switch. A voltage is applied across the switch. A current sensing circuit is connected to one terminal of the switch. The current sensing circuit receives power independently of the voltage. The power derived independently, shares the other terminal of the switch, with the current sensing circuit. The switch is adapted for opening and closing. Upon closing the switch, the current sensing circuit senses the current through the switch. Upon opening the switch, the high voltage of the switch is blocked from the current sensing circuit.

According to a feature of the present invention there is provided a circuit for sensing current flowing through an inductor. The circuit includes: a cathode of a first diode connected to a first side of the inductor. A cathode of a second diode connected to a second side of the inductor. A first node connecting the anode of the first diode with the anode of the second diode. A first voltage divider with a first and second resistor connected between the first node and a power supply. The connection between the first and second resistor forms a second node. A second voltage divider is formed by a third and fourth resistor. A third diode is disposed between the power supply and a ground. The connection between the third and fourth resistor forms a third node. A capacitor is disposed between the ground and the third node. An operational amplifier with a non-inverting input is connected to the second node and an inverting input is connected to the third node. A fifth resistor is connected between the output of the amplifier and the third node. Power is supplied to the operational amplifier and significant current is not drawn from the inductor.

The foregoing and/or other aspects will become apparent from the following detailed description when considered in conjunction with the accompanying figures.

BRIEF DESCRIPTION OF THE DRAWINGS

The invention is herein described, by way of example only, with reference to the accompanying drawings, wherein.

DETAILED DESCRIPTION

Figure 1:
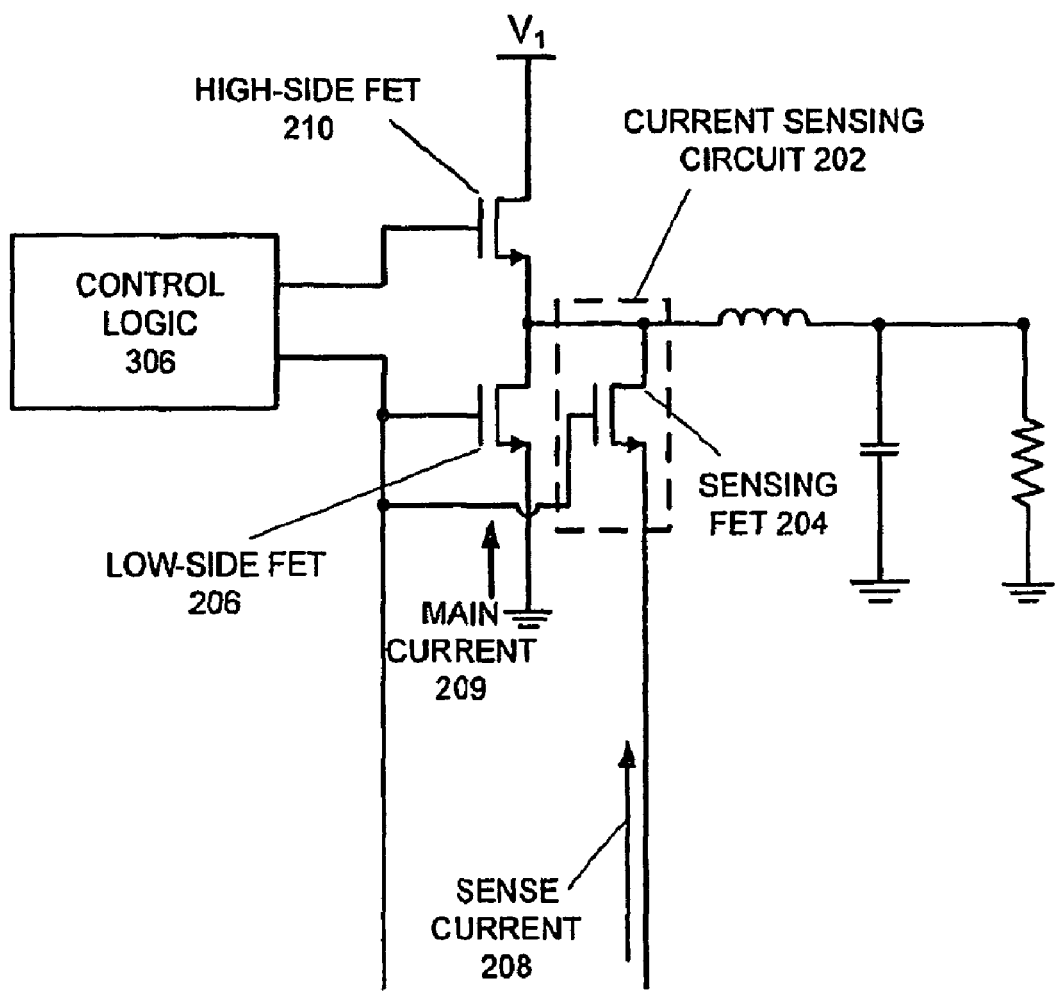
FIG. 1 is a conventional circuit for sensing the output current of a switching regulator.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 1A:
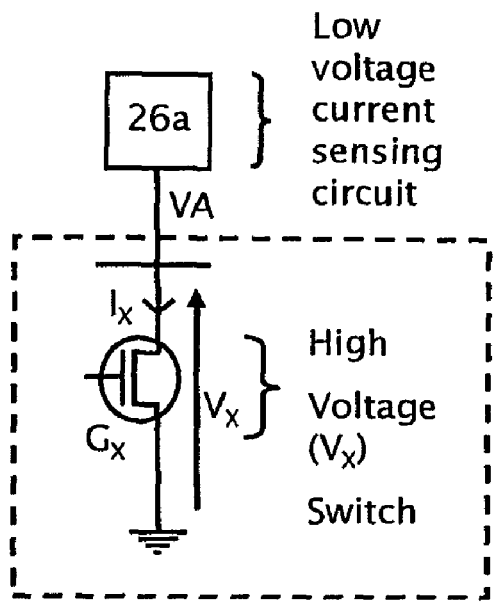
FIG. 1a is block diagram of high voltage switch connected to a current sensing circuit according to an embodiment of the present invention.

Reference is now made to FIG. 1a which is block diagram of high voltage switch $G_X$ connected to a current sensing circuit 26a, according to an embodiment of the present invention. High voltage switch $G_X$ is connected across a high voltage $V_X$ with respect to ground. A current sensing circuit 26a is connected to the high voltage side (VA) of switch $G_X$. In an embodiment of the present invention, switch $G_X$ is a MOSFET. Alternatively switch GX can, in different embodiments of the invention, be a silicon controlled rectifier (SCR), insulated gate bipolar junction transistor (IGBT), bipolar junction transistor (BJT), field effect transistor (FET), junction field effect transistor (JFET), switching diode, mechanically operated single pole double pole switch (SPDT), SPDT electrical relay, SPDT reed relay, SPDT solid state relay, insulated gate field effect transistor (IGFET), DIAC, and TRIAC.

Some embodiments of the present invention are applicable for use in a "switched power converter. The terms "switched power converter" and "switching power converter" are used herein interchangeably and refers to a switching regulator as used for example in a switched-mode power supply (SMPS). While a linear regulator maintains the desired output voltage by dissipating excess power in a pass power transistor, the switched-mode power converter rapidly switches a power transistor between saturation (full on) and cutoff (completely off) with a variable duty cycle whose average is the desired output voltage. The resulting rectangular waveform is typically low-pass filtered with an inductor and capacitor. The "switched power converter" as used herein may perform any type of power conversion or inversion including: alternating current (AC) to direct current (DC) or rectifier operation: DC in to DC out: voltage converter, or current converter, or DC to DC converter; AC in to AC out: frequency changer, cycloconverter, and/or DC in, AC out: inverter.

Figure 1B:
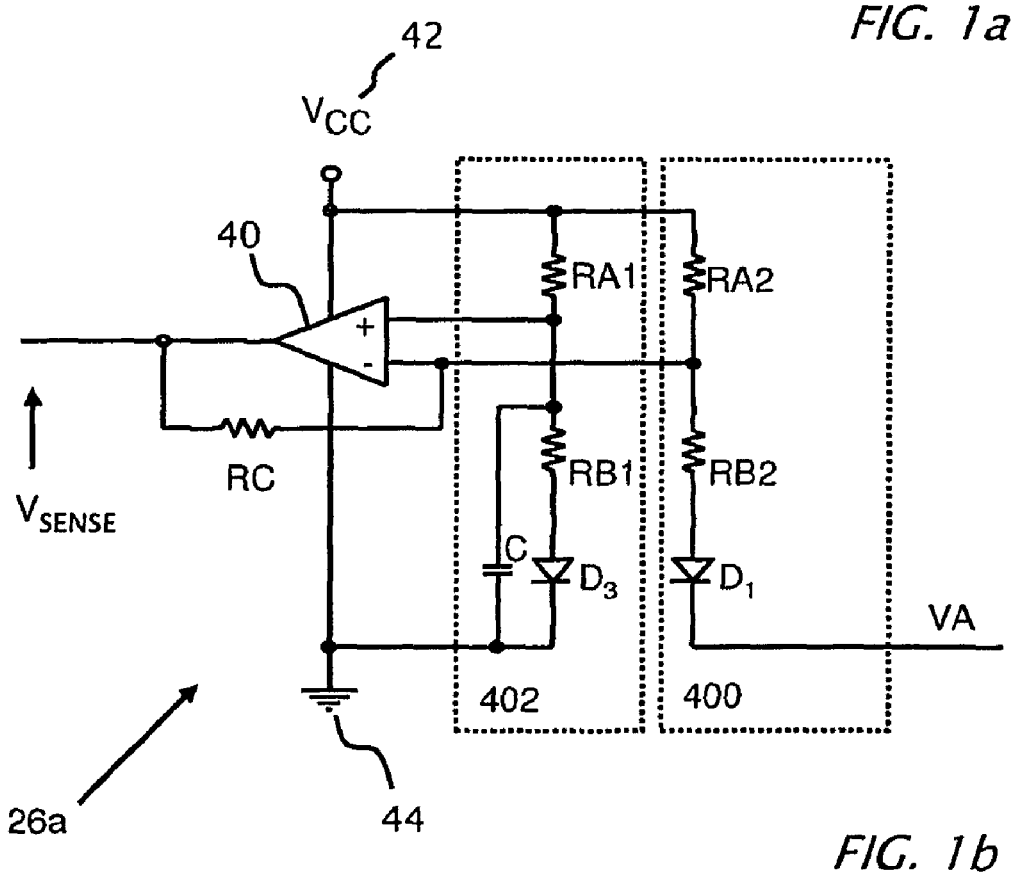
FIG. 1b is a circuit diagram of the current sensing circuit with a single input according to an embodiment of the present invention.

Reference is now also made to FIG. 1b which is a circuit diagram of the current sensing circuit 26a with a single input (VA) according to an embodiment of the present invention. Current sensing circuit 26a has a power supply VCC 42 which is separate from the high voltage $V_X$ across switch $G_X$ as shown in FIG. 1a. Amplifier 40 in an embodiment of the present invention is an operational amplifier (for example OPA2359, Texas Instruments, Dallas, Tex.). It may be noted that other methods for measuring the voltage, such as an Analog to Digital converter (ADC), may also be used. The use of an operational amplifier for this purpose is given here only by way of example. A DC supply $V_{CC}$ 42 and a ground 44 is connected to the power supply inputs of amplifier 40. A voltage divider chain (VDC) 402 is connected between one end of supply $V_{CC}$ and ground 44. VDC 402 has a resistor RA1 with one end connected to supply VCC 42 and the other end connected in series with resistor RB1. The other end of resistor RB1 is connected in series to the anode of diode $D_3$. The cathode of diode $D_3$ is connected to ground 44. The point in VDC 402 where resistors RA1 and RB1 are connected is the non-inverting input to amplifier 40. A capacitor C is connected in parallel across RB1 and $D_3$ and performs function of decoupling the non-inverting input of amplifier 40 and protecting circuit 26a from high voltages on the ground rail. A second VDC 400 is connected between one end of supply $V_{CC}$ and the connection across inductor 28 shown in FIG. 3. VDC 400 has a resistor RA2 with one end connected to supply VCC 42 and the other end connected in series with resistor RB2. The other end of resistor RB2 is connected in to the anode of diode $D_1$. The point in VDC 400 connecting resistors RA2 and RB2 is attached to the inverting input of amplifier 40. The cathode of $D_1$ is connected to the high voltage side of switch $G_X$ as shown in FIG. 1a. A feedback resistor RC is connected between the output of amplifier 40 ($V_{SENSE}$) and the inverting input of amplifier 40. Resistor RC is used to set the gain of amplifier 40. In an embodiment of the present invention, diodes $D_1$ and $D_3$ (for example diode MMSD4148, Fairchild Semiconductor, ME U.S.A.) have a typical maximum repetitive reverse voltage of 100 volts which correspond with the typical voltage values $V_X$ found across MOSFET $G_X$. Diodes $D_1$ and $D_3$ are also preferably matched diodes.

Referring back to FIG. 1a when MOSFET $G_x$ is closed VA is brought low i.e. near in value to the zero volts of the ground connection of MOSFET $G_x$. Current sensing circuit 26a senses the current $I_x$ which flows through MOSFET $G_x$. With voltage VA low, diode $D_1$ is forward biased and a measure of the current $I_x$ flowing through MOSFET $G_x$ is given by Eq.1a when RA1=RA2=RA and RB1=

$$V_{SENSE} = \left[\left(\frac{V_{CC} \cdot RB + VD_3 \cdot RA}{RA + RB}\right) + \frac{RC}{RB}(VD_3 - VD_1 - VA)\right] \quad \text{Eq. 1a}$$

RB2=RB:
where $VD_3$ is the voltage of diode $D_3$. Diode $D_3$ is used to match the voltage drop of $D_1$ so that the amplifier 40 won't reach it's saturation point when switch $G_x$ is conducting. The current measurement will be accurate when MOSFET $G_x$ is conducting. Diode $D_1$ in current sensing circuit 26a is in reverse bias when MOSFET $G_x$ is off and protects current sensing circuit 26a from high voltage VA (typically 100 volts).

Figure 1C:
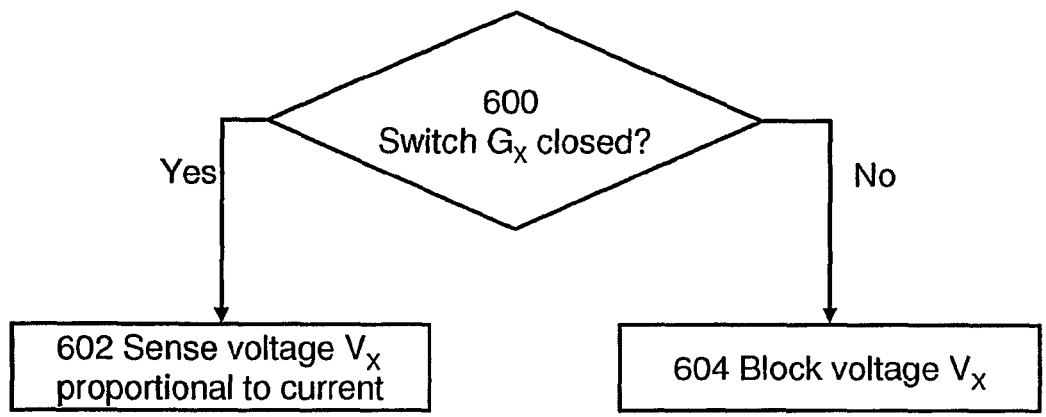
FIG. 1c illustrates a method according to a feature of the present invention.

Reference is now made to FIG. 1c which illustrates a method according to a feature of the present invention. In decision box 600, it is determined whether either switch GX is open or closed, if MOSFET $G_x$ is open the voltage $V_X$ is blocked by current sensing circuit 26a (step 604), if MOSFET $G_X$ is closed the voltage $V_X$ is sensed by current sensing circuit 26a (step 602) as $V_{SENSE}$ proportional to the current $I_x$ flows through MOSFET $G_X$.

Figure 2:
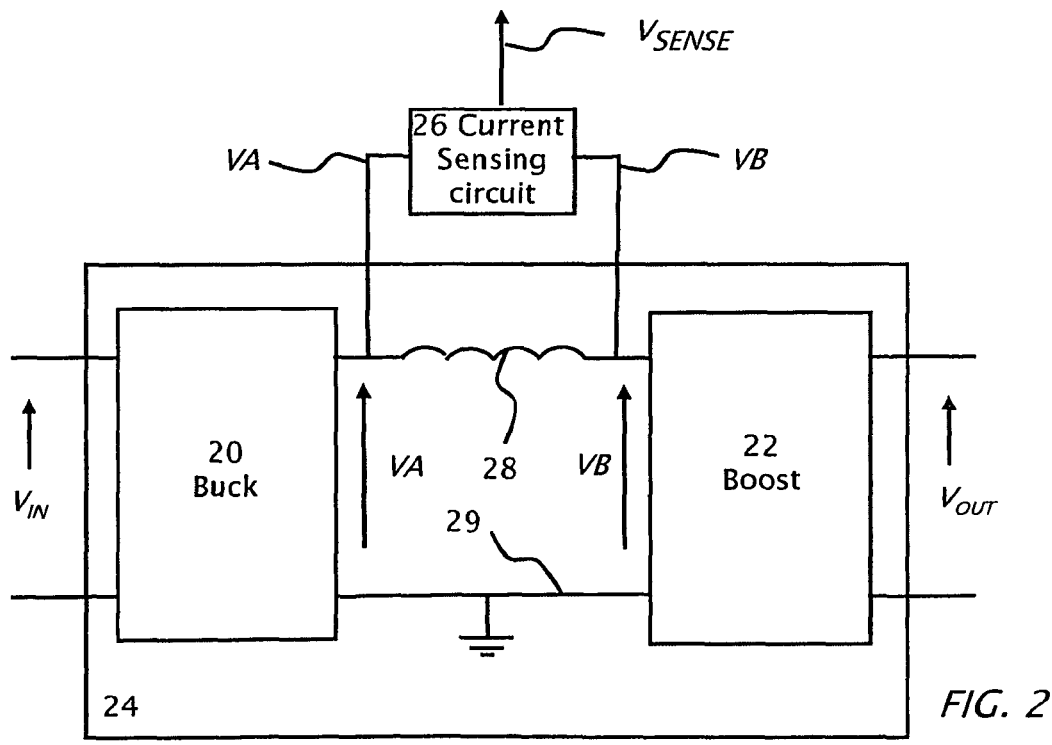
FIG. 2 is a block diagram of a buck and boost converter connected to a current sensing circuit in an embodiment of the present invention.

Reference is now made to FIG. 2 which illustrates schematically a buck boost converter 24 and current sensing circuit 26 according to an embodiment of the present invention. Buck and boost converter 24 has a buck circuit 20 which receives an input voltage $V_{IN}$ to buck and boost converter 24. The output voltage of buck circuit 20 VA is with respect to common rail 29. An inductor 28 and common rail 29 connect the output of buck circuit 20 to the input of boost circuit 22. The input voltage VB of boost circuit 22 is with respect to common rail 29. The output of boost circuit 22 is the output voltage $V_{OUT}$ of buck and boost converter 24. Current sensing circuit 26 is connected across inductor 28 and $V_{SENSE}$ is the output of current sensing circuit 26.

Figure 3:
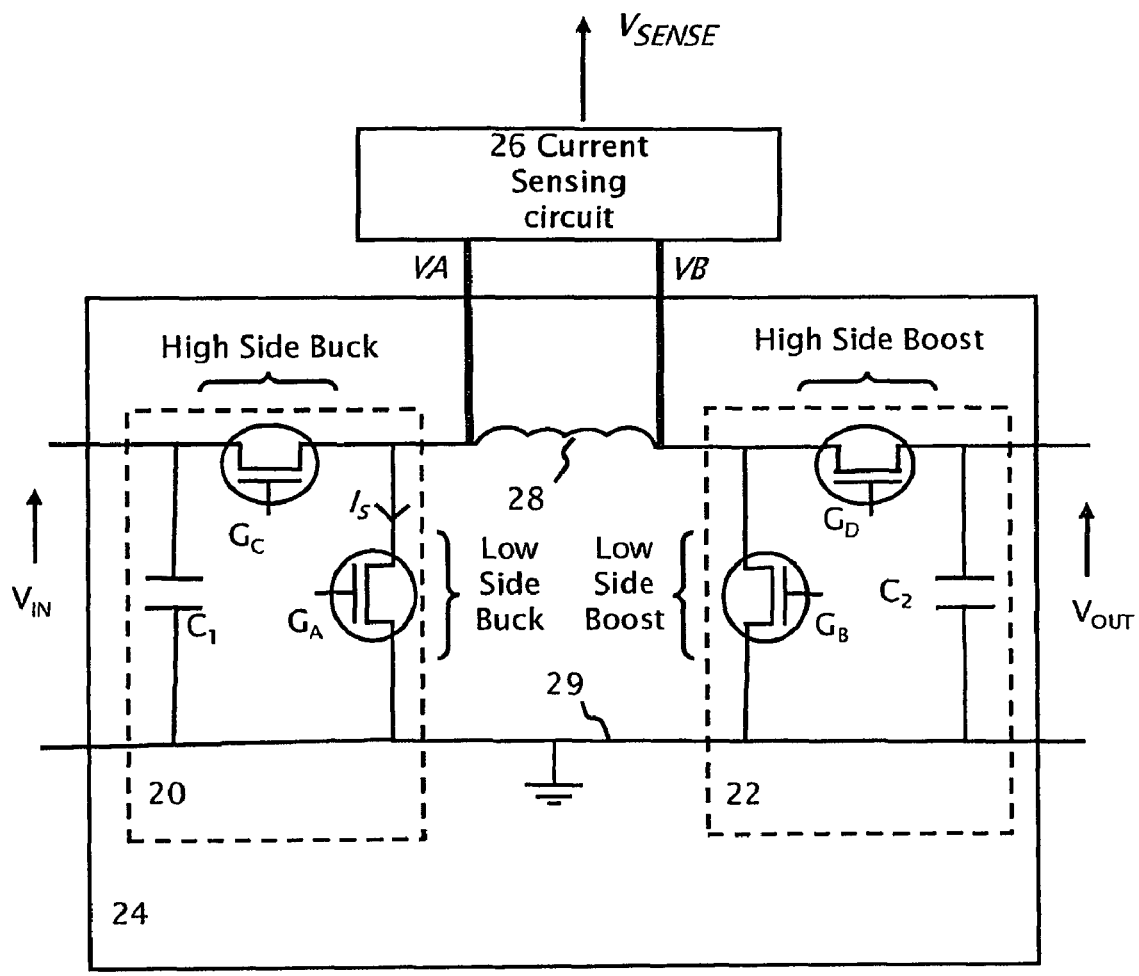
FIG. 3 is a block diagram showing circuit details of the buck and boost converter according to an embodiment of the present invention.

Reference is now made to FIG. 3 which is a block diagram showing circuit details of buck and boost converter 24 according to an embodiment of the present invention. Buck and boost converter 24 has buck circuit 20 which receives the input voltage $V_{IN}$ to buck and boost converter 24. Buck circuit 20 has a low side buck MOSFET $G_A$, shunt connected across the output of buck circuit 20 and a high side buck MOSFET $G_C$, connected in series between the output and input of buck circuit 20. A capacitor $C_1$ is shunt connected across the input of buck circuit 20. The output voltage of buck circuit 20 VA is with respect to common rail 29. Inductor 28 and common rail 29 connects the output of buck circuit 20 to the input of boost circuit 22. Boost circuit 22 has a low side boost MOSFET $G_B$, shunt connected across the input of boost circuit 22 and a high side boost MOSFET $G_D$, connected in series between the output and input of boost circuit 22. A capacitor $C_2$ is shunt connected across the output of boost circuit 22. Current sensing circuit 26 is connected across inductor 28 and $V_{SENSE}$ is the output of current sensing circuit 26.

Figure 3A:
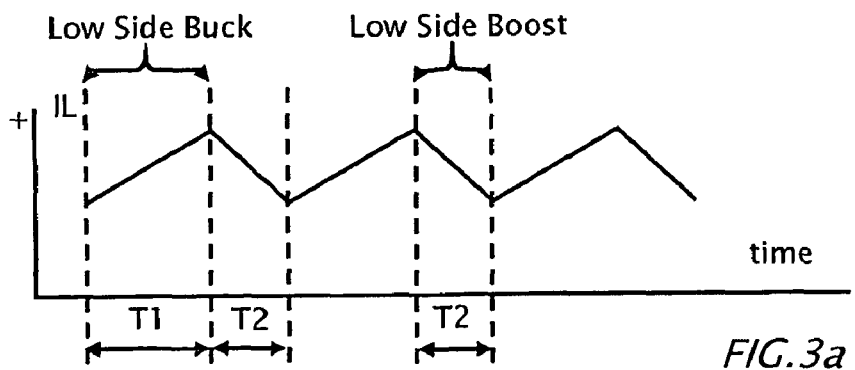
FIG. 3a is graph showing the variation of current in the inductor of a buck and boost circuit according to an embodiment of the present invention.

Reference is now also made to FIG. 3a, a graph showing the variation of current IL in inductor 28 according to an embodiment of the present invention. The working operation of buck and boost converter 24 is in two time phases T1 and T2. Referring back to FIG. 3, in time phase T2 buck and boost converter 24 operates with MOSFETS $G_A$ off, $G_B$ on, $G_D$ off and $G_C$ on. During phase T1 the output voltage of buck circuit 20 VA is approximately the input voltage $V_{IN}$ of buck and boost converter 24 and the input voltage of boost circuit 22 VB is brought low i.e. near in value to the zero volts of common rail 29. In time phase T1, buck and boost converter 24 operates with MOSFETS $G_A$ on, $G_B$ off, $G_D$ on and $G_C$ off. During phase T2 the output voltage of buck circuit 20 VA is brought low i.e. near in value to the zero volts of common rail 29 and the input voltage of boost circuit 22 VB is initially approximately equal to the output voltage $V_{OUT}$ of buck and boost converter 24. During phase T1, current sensing circuit 26 is sensing the current $I_S$ which flows through MOSFET $G_A$.

Figure 4:
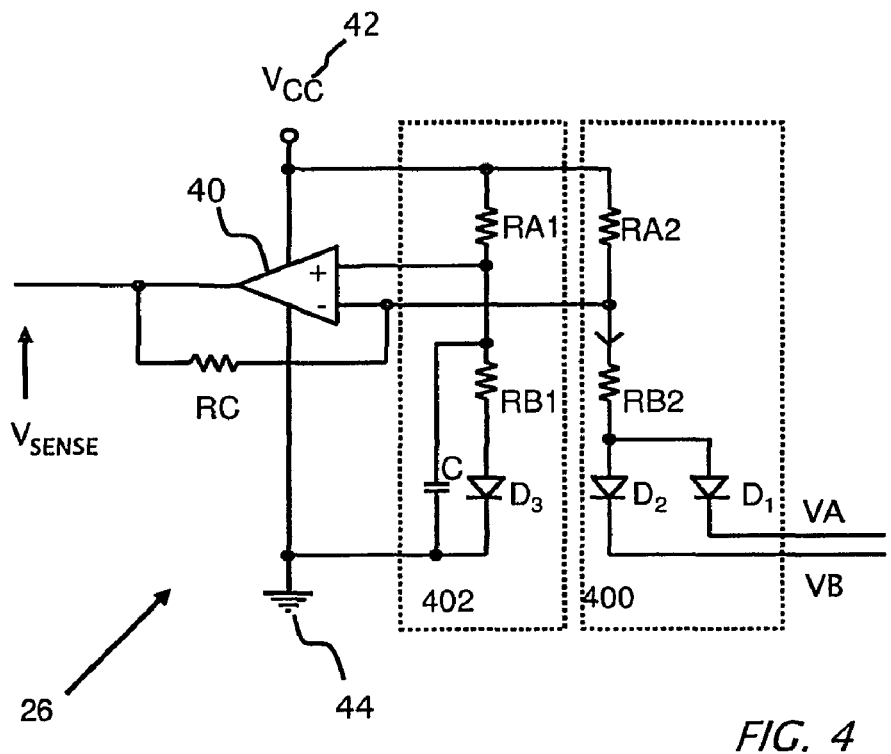
FIG. 4 is circuit diagram of the current sensing circuit according to an embodiment of the present invention.

Reference is now also made to FIG. 4. which is a circuit diagram of current sensing circuit 26 according to an embodiment of the present invention. Amplifier 40 in an embodiment of the present invention is an operational amplifier (for example OPA2359, Texas Instruments, Dallas, Tex.). It may be noted that other methods for measuring the voltage, such as an Analog to Digital converter (ADC), may also be used. The use of an Op-Amp for this purpose is given here only by way of example. A DC supply $V_{CC}$ 42 and a ground 44 is connected to the power supply inputs of amplifier 40. A voltage divider chain (VDC) 402 is connected between one end of supply $V_{CC}$ and ground 44. VDC 402 has a resistor RA1 with one end connected to supply VCC 42 and the other end connected in series with resistor RB1. The other end of resistor RB1 is connected in series to the anode of diode $D_3$. The cathode of diode $D_3$ is connected to ground 44. The point in VDC 402 where resistors RA1 and RB1 are connected is the non-inverting input to amplifier 40. A capacitor C is connected in parallel across RB1 and $D_3$ and performs function of decoupling the non-inverting input of amplifier 40. A second VDC 400 is connected between one end of supply $V_{CC}$ and the connection across inductor 28 shown in FIG. 3. VDC 400 has a resistor RA2 with one end connected to supply VCC 42 and the other end connected in series with resistor RB2. The other end of resistor RB2 is connected in to the anodes of diodes $D_1$ and $D_2$. The point in VDC 400 connecting resistors RA2 and RB2 is attached to the inverting input of amplifier 40. The cathodes of $D_1$ and $D_2$ are connected across inductor 28 as shown in FIG. 3. A feedback resistor RC is connected between the output of amplifier 40 ($V_{SENSE}$) and the inverting input of amplifier 40. Resistor RC is used to set the gain of amplifier 40. In an embodiment of the present invention, diodes $D_1$, $D_2$ and $D_3$ (for example diode MMSD4148, Fairchild Semiconductor, ME U.S.A.) have a typical maximum repetitive reverse voltage of 100 volts which correspond with typical voltages VA and VB found in buck and boost converter 24.

Referring back to FIG. 3a, during phase T1 the output voltage of buck circuit 20 VA is brought low i.e. near in value to the zero volts of common rail 29, and the input voltage of boost circuit 22 VB is initially approximately equal to the output voltage $V_{OUT}$ of buck and boost converter 24. During phase T1, current sensing circuit 26 senses the current $I_S$ which flows through MOSFET $G_A$. Diode $D_2$ in current sensing circuit 26 is in reverse bias and protects current sensing circuit 26 from high voltage VB which is typically 100 volts. During phase T1 with voltage VA low, diode $D_1$ is forward biased and a measure of the current $I_S$ flowing through MOSFET $G_A$ is given by Eq.1 when RA1=RA2=RA and RB1=RB2=RB:

$$V_{SENSE} = \left[\left(\frac{V_{CC}RB}{RA+RB}\right) + VD_3 - (I_S Rds)\frac{RC}{RB}\right] \quad \text{Eq. 1}$$

where Rds is the resistance between drain and source of MOSFET $G_A$ and $VD_3$ is the voltage of diode $D_3$. Diode $D_3$ is used to match the voltage drop across $D_1$ so that the current measurement will be accurate when MOSFET $G_A$ is conducting. During phase T2, current sensing circuit 26 is sensing the current $I_S$ which flows through MOSFET $G_B$. Diode $D_1$ in current sensing circuit 26 is in reverse bias and is protecting current sensing circuit 26 from high voltage VA which is typically 100 volts. During phase T2 with voltage VB low, diode $D_2$ is forward biased and a measure of the current $I_S$ flowing through MOSFET $G_B$ is given by Eq.2 when RA1=RA2=RA and RB1=RB2=RB.

$$V_{SENSE} = \left[\left(\frac{V_{CC}RB}{RA+RB}\right) + VD_3 + (I_S Rds)\frac{RC}{RB}\right] \quad \text{Eq. 2}$$

where Rds is the resistance between drain and source of MOSFET $G_B$ and $VD_3$ is the voltage of diode $D_3$. Diode $D_3$ is used to match the voltage drop across $D_2$ so that the current measurement will be accurate when MOSFET $G_B$ is conducting.

Figure 5:
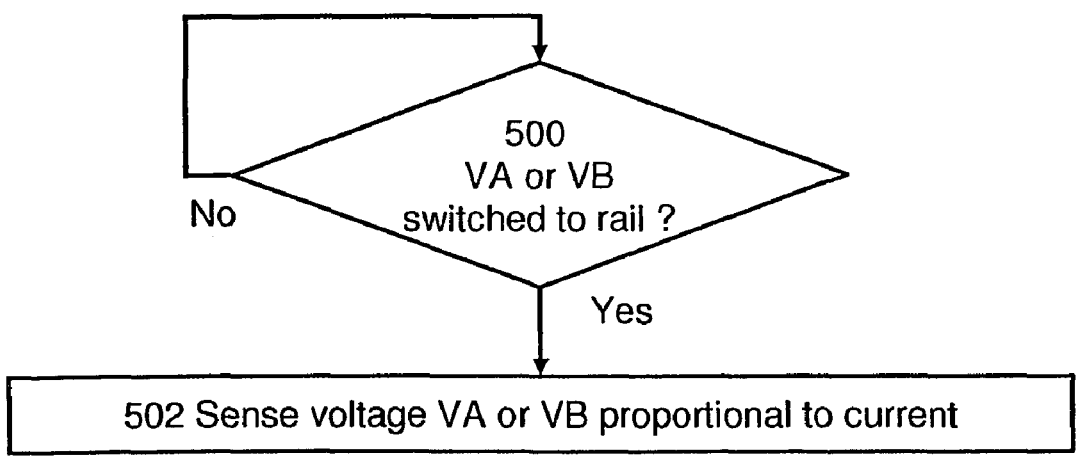
FIG. 5 illustrates a method according to a feature of the present invention.

Reference is now made to FIG. 5 which illustrates a method according to a feature of the present invention. In decision box 500, it is determined whether either of high voltages VA or VB are low (i.e. switched to common rail 29) and if so, the voltage differential between VA and VB is sensed (step 502) as $V_{SENSE}$ proportional to the current Is flowing through MOSFETS $G_A$ or $G_B$.

The articles "a", "an", as used hereinafter are intended to mean and be equivalent to "one or more" or "at least one", For instance, "a switch-e" means "one or more switches".

While the invention has been described with respect to a limited number of embodiments, it will be appreciated that many variations, modifications and other applications of the invention may be made.

The invention claimed is:

1. A circuit for sensing current flowing through an inductor, the circuit comprising:
   a cathode of a first diode connected to a first side of the inductor;
   a cathode of a second diode connected to a second side of the inductor;
   a first node connecting the anode of the first diode with the anode of the second diode;
   a first voltage divider with a first and second resistor connected between the first node and a power supply, wherein the connection between the first and second resistor forms a second node;
   a third resistor connected in series with a fourth resistor to form a second voltage divider;
   wherein the second voltage divider is connected between the power supply and the anode of a third diode;
   wherein the cathode of the third diode is connected to a ground;
   wherein the connection between the third and fourth resistor forms a third node;
   a capacitor connected between the ground and the third node;
   an operational amplifier with a non-inverting input connected to the third node and an inverting input connected to the second node; and
   a fifth resistor connected between the output of the amplifier and the second node;
   wherein power is supplied to the operational amplifier and substantially zero current is drawn from the inductor.

2. A device for sensing current flow in a switched power converter circuit, the switched power converter circuit including a first semi-conductor switch, wherein said first semi-conductor switch includes: (i) a first power terminal connected to a first voltage (ii) a second power terminal connected to ground, (iii) a control terminal operatively connected to a drive circuit, wherein said drive circuit drives selectively either a maximal current between said first power terminal and said second power terminal or a substantially zero current between said first power terminal and said second power terminal, the device for sensing current flow comprising:
   an operational amplifier;
   a reference voltage connected to a first differential input of said operational amplifier;
   a diode with a first anode connected to a second differential input of said operational amplifier;
   wherein a second reference voltage is connected to said second differential input of said amplifier, and wherein at least one of said maximal current and said substantially zero current modifies said second reference voltage applied to said second differential input of said amplifier, and wherein an output voltage of said operational amplifier is responsive to said maximal current and said substantially zero current;
   a first cathode of said diode connected to said first power terminal of the first semi-conductor switch.

3. The device according to claim 2, wherein said first semi-conductor switch is selected from the group consisting of: silicon controlled rectifier (SCR), insulated gate bipolar junction transistor (IGBT), bipolar junction transistor (BJT), field effect transistor (FET), junction field effect transistor (JFET), insulated gate field effect transistor (IGFET), metal oxide semiconductor field effect transistor (MOSFET), diode for alternating current (DIAC), and triode for alternating current (TRIAC).

4. The device according to claim 2,
   wherein said diode does not draw current from said first voltage;
   wherein said first voltage is blocked from said second differential input of said amplifier when substantially zero current flows between said first power terminal and said second power terminal.

5. The device for sensing current flow according to claim 2, wherein the switched power converter further includes a second semi-conductor switch including (iv) a third power terminal attached to a second voltage (v) a fourth power terminal attached to ground, (vi) a second control terminal operatively connected to the drive circuit, wherein the drive circuit drives selectively either a second maximal current between said third power terminal and said fourth power terminal or a second substantially zero current between said third power terminal and said fourth power terminal, wherein the maximal current flows in said first semi-conductor switch when said second substantially zero current flows in said second semi-conductor switch, wherein said second maximal current flows in said second semi-conductor switch when said substantially zero current flows in said first semi-conductor switch, (vi) an inductor attached between said first power terminal and said third power terminal, the device for sensing current flow further comprising:
   a second diode with a second anode connected to said first anode and a second cathode attached to said third power terminal;
   wherein said output voltage of said amplifier is responsive to a current flowing in said inductor.

6. The device according to claim 5, wherein said second semi-conductor switch is selected from the group consisting of: silicon controlled rectifier (SCR), insulated gate bipolar junction transistor (IGBT), bipolar junction transistor (BJT), field effect transistor (FET), junction field effect transistor (JFET), insulated gate field effect transistor (IGFET), metal oxide semiconductor field effect transistor (MOSFET), diode for alternating current (DIAC), and triode for alternating current (TRIAC).

7. The device according to claim 5, wherein said operational amplifier does not integrate a voltage across said inductor.

8. The device according to claim 2, wherein said switched power converter includes selectably either: a buck converter, a boost converter, a buck followed by a boost converter or a buck-boost converter.

9. The circuit according to claim 2, wherein said first semi-conductor switch is a metal oxide semiconductor field effect transistor (MOSFET).

10. The device according to claim 2, wherein said operational amplifier draws operating current from a power supply other than the first voltage connected to the first power terminal.

11. The device according to claim 2, wherein said operational amplifier draws operating current from a power supply which is not the power supply of the switched power converter circuit.

12. The device according to claim 2, wherein said switched power converter circuit is selectably either: a buck converter a boost converter or a buck/boost converter.

13. In a device to sense current flow in a switched power converter circuit, the switched power converter circuit including: a first semi-conductor switch including a first power terminal connected to a first voltage, a second power terminal connected to ground, a control terminal operatively connected to a drive circuit, wherein the drive circuit drives selectively either a maximal current between the first power terminal and the second power terminal or a substantially zero current between the first power terminal and the second power terminal, the device including a reference voltage connected between a first differential input of an operational amplifier and the ground, a diode with a first anode connected to a second differential input of the operational amplifier, wherein a second reference voltage is connected between the second differential input of the operational amplifier and ground, and a first cathode of the diode connected to the first power terminal, a method comprising the steps of:
 upon a current flowing between the first power terminal and the second power terminal approaching the maximal current, sensing the current through said first power terminal and said second power terminal; wherein an output voltage of the operational amplifier is responsive to said current;
 upon a current flowing between said first power terminal and said second power terminal approaching the substantially zero current, blocking the first voltage of the first power terminal from the current sensing circuit by the first cathode of said diode.

14. The method of claim 13, wherein the switched power converter further includes a second semi-conductor switch including a third power terminal connected to a second voltage a fourth power terminal connected to ground, a second control terminal operatively connected to the drive circuit, wherein the drive circuit drives selectively either a second maximal current between said third power terminal and said fourth power terminal or a second substantially zero current between said third power terminal and said fourth power terminal, wherein the maximal current flows in said first semi-conductor switch when said second substantially zero current flows in said second semi-conductor switch, wherein said second maximal current flows in said first semi-conductor switch when said substantially zero current flows in said second semi-conductor switch, an inductor attached between said power terminal and said third power terminal, the method further comprising:
 connecting a second diode with a second anode connected to said first anode and a second cathode attached to said third power terminal;
 sensing an output voltage of said amplifier responsive to a current flowing in said inductor.

15. The method of claim 13, wherein said first semi-conductor switch is selected from the group consisting of: silicon controlled rectifier (SCR), insulated gate bipolar junction transistor (IGBT), bipolar junction transistor (BJT), field effect transistor (FET), junction field effect transistor (JFET), insulated gate field effect transistor (IGFET), metal oxide semiconductor field effect transistor (MOSFET), diode for alternating current (DIAC), and triode for alternating current (TRIAC).

16. The method of claim 13, wherein said maximal current and said substantially zero current modifies said second reference voltage applied to said second differential input of said amplifier.

17. The method of claim 13, wherein an output voltage of said amplifier is responsive to the maximal current and the substantially zero current.

18. The method of claim 13, wherein the device does not draw current from the first power terminal connected to the first voltage.

19. The method of claim 13, wherein said first voltage is blocked from said second differential input of said amplifier when said substantially zero current flows between said first power terminal and said second power terminal.

* * * * *